United States Patent

[11] 3,557,836

| [72] | Inventor | Aaron Kutz<br>Forest Hills, N.Y. |
|------|----------|-----|
| [21] | Appl. No. | 765,952 |
| [22] | Filed | Oct. 8, 1968 |
| [45] | Patented | Jan. 26, 1971 |
| [73] | Assignee | Fluidic Controls Corporation<br>South Hackensack, N.J.<br>a corporation of New Jersey |

[54] DIAPHRAGM VALVE
21 Claims, 1 Drawing Fig.

[52] U.S. Cl. .................................................. 137/625.66
[51] Int. Cl. .................................................. F16k 11/02
[50] Field of Search ........................................... 92/62, 84,
101; 137/625.6, .61, .64, .66, .26, .27; 251/61.1,
.2, .3

[56] References Cited
UNITED STATES PATENTS

| 3,016,065 | 1/1962 | Stampfli | 137/625.64 |
| 3,030,928 | 4/1962 | Jaquith et al. | 137/625.61X |
| 3,252,471 | 5/1966 | Olson | 92/101X |
| 3,316,938 | 5/1967 | Fedoseev et al. | 137/625.66 |

Primary Examiner—Henry T. Klinksiek
Attorney—James and Franklin

ABSTRACT: A valve member of a diaphragm valve engages a diaphragm of a relatively small area, that diaphragm in turn being acted upon by a control diaphragm of a larger area against which a control signal fluid is applied to actuate the valve member. The surface of the smaller area diaphragm is acted upon by the external-controlled fluid and thus effectively isolates the control diaphragm from the controlled fluid. As a result of the different areas of the two diaphragms, the control signal acting upon the control diaphragm is effective to actuate the valve member even though the pressure of the control signal fluid may be equal to or less than (as well as greater than) the pressure of the controlled fluid.

PATENTED JAN 26 1971 3,557,836
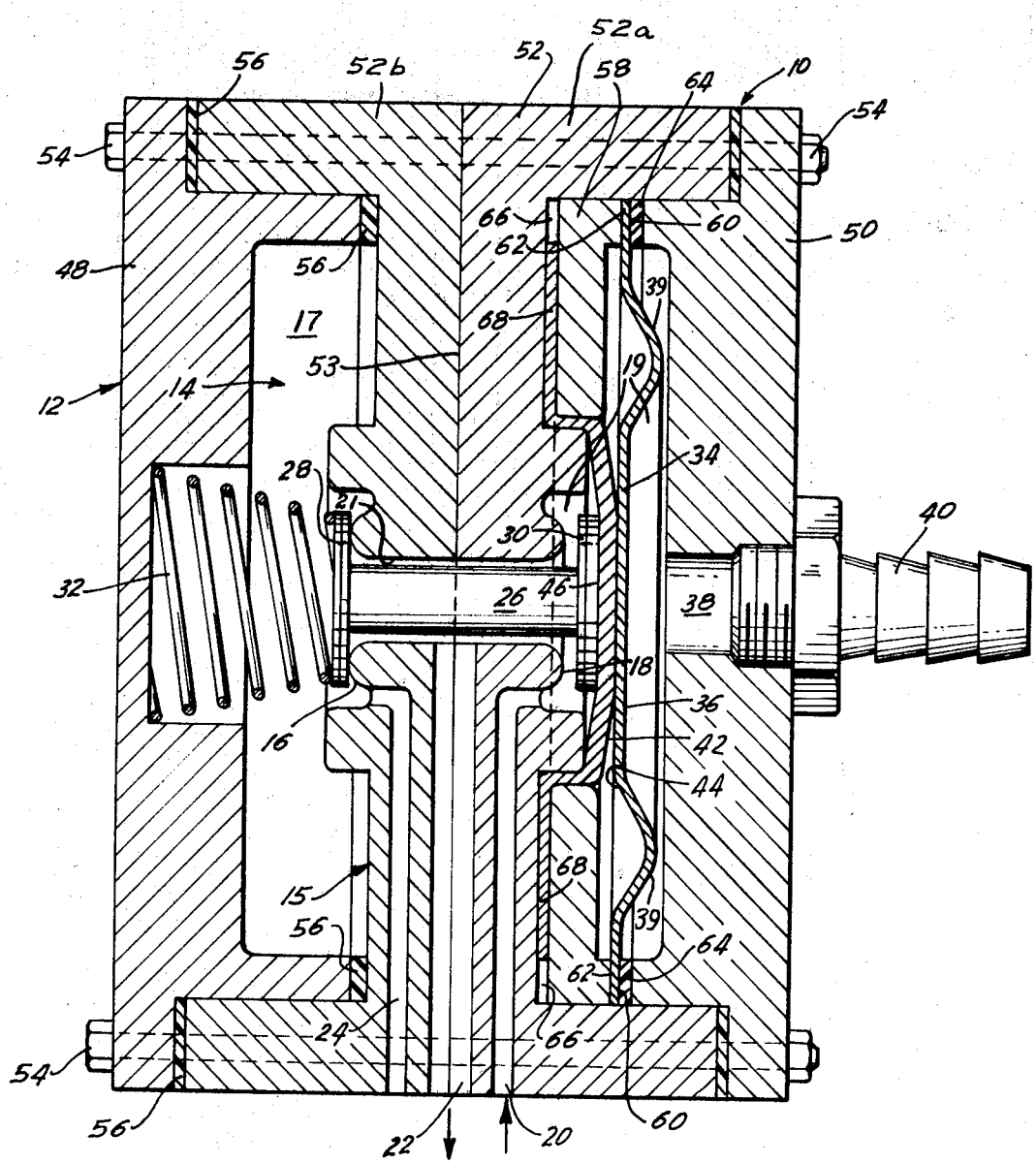
INVENTOR
AARON KUTZ
BY James A Franklin
ATTORNEY

DIAPHRAGM VALVE

The present invention relates to valves and particularly to diaphragm operated valves.

Diaphragm valves are those valves in which the valve member is moved between its operative positions within the valve body as a result of fluid pressure exerted on a diaphragm which in turn operatively engages the valve member. These valves are commonly used in pressure sensing and controlling systems in which the pressure of a fluid is sensed and then impressed upon the diaphragm, so that at a particular value of fluid pressure, the pressure on the diaphragm is sufficient to cause the diaphragm to bear against the valve member, thereby moving the valve member to either close off or divert the external fluid flow. Valves of the diaphragm type are also commonly used in pressure regulating systems to maintain the external pressure of an external fluid system within a predetermined range.

The use of diaphragm valves of the type described has however, heretofore been limited for the reason that the surface of the diaphragm opposite to that surface which receives the control fluid thereon is also commonly arranged within the fluid flow path of the controlled fluid system. As a result, in the event that the controlled fluid pressure is greater than, or even equal to, that of the control signal fluid when the latter is applied to the diaphragm, the net force on the diaphragm resulting from the opposing fluid pressures applied thereto by the external-controlled fluid and the control signal fluid will be in a direction opposite to the desired movement of the valve member, thereby preventing the diaphragm from actuating the valve member to control its movement in the desired manner. This limitation in the utility of diaphragm valves is of particular significance in the operation of relay valves in which the valve performs a logic operation in response to the presence or absence of a control signal applied against the diaphragm. That is, the valve member is positioned in either one of two operative positions to control the nature of the external fluid flow in accordance with the presence or absence of the control signal. It will be understood from the above that in order for a diaphragm valve to be reliably operative as a relay valve, it must be operated in a system in which the pressure of the control signal fluid is at all times greater than the external circuit or controlled fluid pressure. This requirement on the relative fluid pressures places limitations on the potential applications of diaphragm relay valves, and thus requires the use of complex fluid systems to insure that the relative magnitudes of the pressures of the various fluids are proper for reliable and effective operation. As a result, the use of diaphragm valves has not been as widespread as would be desirable.

It is, therefore, an object of the present invention to provide a diaphragm valve in which the limitations of the known valves of this type are substantially overcome.

It is a further object of the present invention to provide a diaphragm valve in which the pressure of the control signal applied to the diaphragm can be less than or equal to the pressure of the external circuit or controlled fluid and still be reliably operative.

It is yet a further object of the present invention to provide a diaphragm controlled relay valve in which the control diaphragm is effectively isolated from the external-controlled fluid circuit so that the valve may be operated over a greater range of control signal pressures than had heretofore been feasible for valves of this type.

To these ends, the present invention provides a valve of the type having a valve body in which a valve member is disposed in a fluid chamber disposed between inlet and outlet ducts for an external-controlled fluid, means are provided to normally bias the valve member into a first position in which the valve member controls fluid communication between said inlet and outlet ducts in a first fashion, and means are provided to move the valve member to a second position in which such communication is controlled in a second fashion. This movement of the valve member in this type of valve is effected by the operation of a control diaphragm located in proximity to one end of the valve member and having a surface against which a control fluid signal acts, the control diaphragm thereupon being operative upon the valve member to effectively move the latter to its second position. In accordance with the present invention, there is provided a means effective to isolate the control diaphragm from the pressure of the external controlled fluid, such means comprising an isolating diaphragm interposed between the valve member and the control diaphragm. In an exemplary form of this invention, the isolating diaphragm has a surface acted upon by the external controlled fluid, that surface having an area which is substantially less than that of the control diaphragm which receives the control fluid signal. Since the force on a surface is equal to the product of the pressure on that surface and the area thereof, the net force acting upon the fluid-receiving surface of the isolating diaphragm will be less than the net force acting on the control fluid-receiving surface of the control diaphragm even when the control fluid pressure is less than or equal to the external controlled fluid pressure. As a result, the valve of this invention may be utilized over a wide range of control fluid pressure which could not be utilized in the presently known valves of this type.

To the accomplishment of the above, and to such other objects as may hereinafter appear, the present invention relates to the construction and manner of operation of a diaphragm valve as defined in the accompanying claims and as described in this specification, taken together with the accompanying drawing in which:

The FIG. is a cross sectional view of a diaphragm controlled valve according to the present invention.

A diaphragm valve, designated generally as 10, constructed in accordance with the present invention, comprises a valve body 12 embodying all of the component parts of the diaphragm valve. The valve body in one of its components is formed with a fluid chamber generally designated 14 comprising an exhaust portion 17, an inlet portion 19 and a fluid passage 21 therebetween. Chamber 14 cooperates with a conduit structure generally designated as 15. The conduit structure is formed at its inner end with the spaced valve seats 16 and 18 located within the exhaust and inlet portions respectively of the fluid chamber. The conduit structure 15 is formed with the controlled fluid ducts comprising in the exemplified structure an inlet duct 20, an outlet duct 22 and an exhaust duct 24. A valve member, herein specifically disclosed as a poppet valve member 26, is axially movable in the passage 21 and includes opposite end portions 28 and 30 in the form of discs which are respectively adapted to engage the valve seats 16 and 18 depending on the axial position of the valve member 26. Means in the form of a compression spring 32 normally biases the valve member 26 to the position shown in the FIG., in which the valve disc 28 engages the valve seat 16 so as to close the valve to a fluid flow communication between the inlet duct 20 and the exhaust duct 24 and to open flow communication of the controlled fluid from the inlet duct 20 to the outlet duct 22, the flow of the controlled fluid being at this point in the directions indicated by the arrows applied to said ducts 20 and 22.

A flexible control diaphragm 34 is provided in inlet chamber portion 19 adjacent end portion 30 of valve member 26 and has a first surface 36 open to the orifice 38 which is adapted to receive therethrough a control fluid same from a control fluid supply connected to conduit 40. As shown in the FIG., surface 36 of diaphragm 34 is formed with annular stiffening ring 39 adjacent its perimeter. Diaphragm 34 is constructed of a material which, while flexible, is sufficiently stiff and resilient to retain its basic shape under fluid pressure of the magnitude here involved. When the control fluid passes through orifice 38 and engages surface 36 of the diaphragm 34, the diaphragm is urged toward the left in the FIG., which in turn urges end portion 30 of a valve member 26 to the left against the action of spring 32 until the end portion 30 engages the valve seat 18 and the opposite end portion 28 is moved out of engagement with the valve seat 16. When this occurs, the controlled fluid entering duct 20 now can no longer exit through the controlled outlet duct 22, and the outlet duct 22 is connected to exhaust duct 24. It should be noted that the shape and stiffness of diaphragm 34 is such as to insure that the annular stiffening ring 39 is not forced against conduit structure 15, the entire force on surface 34 of diaphragm 36 being transmitted to valve 26. Thus, the selective application of a control fluid on the fluid-receiving surface 36 of diaphragm 34 is effective to actuate the valve member 26 and thus to close the path of communication of the controlled fluid to the outlet duct 22 and to open said outlet duct to exhaust.

In accordance with the present invention means are provided effective to isolate the control diaphragm 34 from the external circuit controlled fluid. In the exemplified embodiment of this invention herein disclosed, such means is in the form of an isolating diaphragm 42 interposed between the end portion 30 of valve member 26 and the control diaphragm 34 and in operative engagement with valve member end portion 30. The isolating diaphragm 42 is arranged to be contacted and engaged by the control diaphragm 34. The reason for providing isolating diaphragm 42 will become clear from an analysis of the operation of the valve in the absence thereof. If isolating diaphragm 42 were not provided in the manner shown, the surface 44 of control diaphragm 34, which is opposite to that surface 36 upon which the control signal fluid is effective, would be in direct communication with the external-controlled fluid in the inlet portion 19 of fluid chamber 14, and would thus receive thereon the pressure of that controlled external circuit fluid. The force to the right on control diaphragm 34 would be effected by spring 32 and the pressure of the external-controlled fluid acting on surface 44; and thus control diaphragm 34 would move or remain to the right in the illustrated FIG. and thus away from valve member 26, and control diaphragm 34 would not be effective to actuate valve member 26 and move it to the left as desired for relay operation, unless the pressure of the control fluid is sufficient to overcome the pressure of the external-controlled fluid in combination with the force exerted by the spring 32. The potential utilization of valve 10 is thus limited by such static pressures of the control signal and the external-controlled fluids.

The interposition of the isolating diaphragm 42 in the fluid chamber 14 and between valve member 26 and the control diaphragm 34 effectively overcomes this limitation of the prior art diaphragm valves in which such an isolating diaphragm is absent. The area of surface 46 of isolating diaphragm 42, which is subject to the flow and pressure of the external-controlled fluid in the fluid chamber 14, is made less than the effective area of surface 36 of control diaphragm 34 upon which the control fluid signal is applied. As known, the net force acting on a surface to which pressure is applied is equal to the product of that pressure and the area of that surface. Thus, even with a greater controlled fluid pressure applied to surface 46 of isolating diaphragm 42 as compared to the pressure of the control fluid signal active on control diaphragm 34, the net force acting on control diaphragm 34, due to the control signal fluid pressure urging diaphragm 34 to the left, can be made to exceed the net opposing force acting on diaphragm 42 due to the pressure of the controlled fluid on its reduced area surface 46 and the force of the spring 32, even for relatively large differences in the pressures respectively applied thereto, simply by designing the diaphragms 34 and 42 with an appropriate ratio of surface areas. Effective and reliable operation of diaphragm valve 10 will thus be achieved whenever the pressure area product operative on control diaphragm 34 exceeds that operative on isolating diaphragm 42.

In operation, in the absence of a control signal at diaphragm 34 the position of valve member 26 is as shown in the illustrated FIG., end portion 28 engaging valve seat 16. The application of a suitable control signal at diaphragm 34 of a pressure equal to or less than (as well as greater than) the pressure of the controlled fluid, causes diaphragm 34 to be urged toward the left in the FIG. and to bear against isolating diaphragm 42 to cause valve member 26 which is operatively engaged therewith to move towards the left, with the resulting engagement of end portion 30 with valve seat 18, and the disengagement of end portion 28 from valve seat 16. Thus, it will be clearly seen that even when the pressure of the external-controlled fluid is equal to or greater than the pressure of the control fluid, the operation of control diaphragm 34 will still be effective to actuate and thus position valve member 26 in the desired manner, as control diaphragm 34 is now effectively isolated from the controlled fluid.

In an exemplary form of the valve 10 of this invention body 12 is formed of three body sections, namely, the two end sections 48 and 50 and the middle section 52, the latter in turn being formed of two parts 52a and 52b meeting at a plane 53 through output duct 22, the securing of these portions being effected by fasteners 54, appropriate sealing gaskets 56 being provided between these body portions to provide for a fluid tight seal therebetween. An annular segment 58 is provided between body sections 50 and 52 and defines with end section 50, slot 60 for receiving the outer end 62 of control diaphragm 34, suitable sealing gaskets 64 being provided between ends 62 and body section 50. Similarly, an annular slot 66 is defined between body section 52 and segment 58 in which the outer end 68 of isolating diaphragm 42 is received and retained therein in a fluid tight, sealed arrangement.

Thus, a diaphragm valve has been provided in which the control diaphragm is effectively isolated from the external controlled fluid system, and thus is capable of operating effectively and reliably even when the pressure of the control fluid signal is less than or equal to the pressure of the external or controlled fluid. This construction thus greatly increases the potential applications of valves of this type and makes the pressure magnitudes of the fluids involved far less critical than in the earlier diaphragm valves of this type. The improvements derived from this invention are achieved in an inexpensive manner by a modification of the existing diaphragm valves which can be incorporated in these known diaphragm valves with a minimum of difficulty.

The term "diaphragm" is here used generally to include any moveable element to a surface of which pressure is to be applied, such as pistons, bellows, and the like. The particular arrangement of valve seats, ducts and the like is likewise exemplary. Purely by way of example, duct 24 can be eliminated, or duct 24 could be used as a pressure inlet and duct 20 as exhaust. Other variations will suggest themselves. It will be understood that the embodiment of the present invention here specifically disclosed is but exemplary, and that many changes may be made therein, all within the scope of the present invention as defined in the following claims.

I claim:

1. A diaphragm valve comprising a valve body having a fluid chamber, an inlet duct, an outlet duct and an exhaust duct, all communicating with said chamber and thus with each other, and all adapted to receive a controlled fluid, a rigid valve member moveable in said chamber between a first position simultaneously opening communication between said inlet and outlet ducts and closing the communication of said exhaust duct with both of said inlet and outlet ducts, and a second position simultaneously closing communication of said inlet duct with both of said exhaust and outlet ducts and opening communication between said outlet duct and said exhaust duct, resilient means for normally biasing said valve member to said first position, and means for moving said valve member to said second position comprising a control diaphragm activated on one surface thereof by the pressure of a control fluid separate from said controlled fluid and positioned with respect to said valve member for moving the latter to said second position, and isolating means interposed in said fluid chamber in the path of the controlled fluid and intermediate said valve member and said control diaphragm and effective to isolate said control diaphragm from the controlled fluid and having an effective surface area exposed to the controlled fluid which is less than the area of the control diaphragm subject to the control fluid, whereby the force on said isolating means, as a result of the pressure of the controlled fluid active thereon is less than the force on said control diaphragm as a result of the pressure of the control fluid to which it is subject under conditions when the control fluid pressure is less than or equal to the controlled fluid pressure, the differential between the said forces under said conditions being effective on said valve member to move the latter from its first position to its second position against the bias of said resilient means.

2. The diaphragm valve of claim 1, in which said isolating means comprises an isolating diaphragm having a surface area in the path of the controlled fluid less than the area of the surface of said control diaphragm against which said control fluid is applied.

3. The diaphragm valve of claim 2, in which said isolating diaphragm is in operative engagement with said valve member when said valve member is in its said first position.

4. The diaphragm valve of claim 3, in which said valve body has formed therein an internal groove receiving and retaining therein the outer portion of said isolating diaphragm in substantially fluidtight arrangement.

5. The diaphragm valve of claim 1, in which said isolating means is in operative engagement with said valve member when said valve member is in its said first position.

6. The diaphragm valve of claim 5, in which said valve body has formed therein an internal groove receiving and retaining therein the outer portion of said isolating means in substantially fluid tight relationship.

7. The diaphragm valve of claim 2, in which said body comprises an inner section and an end section in sealing relation to one another and defining between them a portion of said chamber, an annular element in said chamber portion between said sections, the outer portions of said control diaphragm and of said isolating diaphragm being clamped between said annular element and one and the other of said sections respectively.

8. The diaphragm valve of claim 7, in which said inner section has a passage opening at one end into said chamber through which passage said valve member is movable, a first fluid duct communicating with said passage, a valve seat at the end of said passage opening into said chamber portion, with which seat said valve member cooperates, and a second fluid duct in said inner section communicating with said chamber portion.

9. The diaphragm valve of claim 8, in which said inner section comprises two parts meeting at a plane through said first fluid duct.

10. The diaphragm valve of claim 8, in which said body comprises a second end section defining a second chamber portion on the opposite side of said inner section from said first chamber portion, said passage opens at its other end into said second chamber portion and there has a valve seat with which said valve member cooperates, and a third fluid duct in said inner section communicating with said second chamber portion.

11. The diaphragm valve of claim 9, in which said inner section comprises two parts meeting at a plane through said first fluid duct.

12. The diaphragm valve of claim 2, in which said body comprises an inner section and an end section in sealing relation to one another and defining between them a portion of said chamber, said inner section has a passage opening at one end into said chamber portion through which passage said valve member is movable, a first fluid duct communicating with said passage, a valve seat at the end of said passage opening into said chamber portion, with which seat said valve member cooperates, and a second fluid duct in said inner section communicating with said chamber portion.

13. The diaphragm valve of claim 12, in which said inner section comprises two parts meeting at a plane through said first fluid duct.

14. The diaphragm valve of claim 12, in which said body comprises a second end section defining a second chamber portion on the opposite side of said inner section from said first chamber portion, said passage opens at its other end into said second chamber portion and there has a valve seat with which said valve member cooperates, and a third fluid duct in said inner section communicating with said second chamber portion.

15. The diaphragm valve of claim 14, in which said inner section comprises two parts meeting at a plane through said first fluid duct.

16. The diaphragm valve of claim 1, in which said body comprises an inner section and an end section in sealing relation to one another and defining between them a portion of said chamber, an annular element in said chamber portion between said sections, the outer portions of said control diaphragm and of said isolating means being clamped between said annular element and one and the other of said sections respectively.

17. The diaphragm valve of claim 16, in which said inner section has a passage opening at one end into said chamber portion through which passage said valve member is movable, a first fluid duct communicating with said passage, a valve seat at the end of said passage opening into said chamber portion, with which seat said valve member cooperates, and a second fluid duct in said inner section communicating with said chamber portion.

18. The diaphragm valve of claim 17, in which said body comprises a second end portion defining a second chamber portion on the opposite side of said inner section from said first chamber portion, said passage opens at its other end into said second chamber portion and there has a valve seat with which said valve member cooperates, and a third fluid duct in said inner section communicating with said second chamber portion.

19. The diaphragm valve of claim 1, in which said body comprises an inner section and an end section in sealing relation to one another and defining between them a portion of said chamber, said inner section has a passage opening at one end into said chamber portion through which passage said valve member is movable, a first fluid duct communicating with said passage, a valve seat at the end of said passage opening into said chamber portion, with which seat said valve member cooperates, and a second fluid duct in said inner section communicating with said chamber portion.

20. The diaphragm valve of claim 19, in which said body comprises a second end section defining a second chamber portion on the opposite side of said inner section from said first chamber portion, said passage opens at its other end into said second chamber portion and there has a valve seat with which said valve member cooperates, and a third fluid duct in said inner section communicating with said second chamber portion.

21. The diaphragm valve of claim 1, in which said body comprises two end sections and an inner section dividing said chamber into an exhaust portion communicating with said exhaust duct and an inlet portion communicating with said inlet duct, and a passage in said inner section between said exhaust and inlet portions said passage communicating with said outlet duct, said valve member being movable in said passage and being provided with end portions having operative valve surfaces disposed in said exhaust and inlet chambers respectively, valve seats at either end of said passage with which said respective valve surfaces are adapted to cooperate to close off communication between said passage and the chamber portion within which they are respectively disposed, said control diaphragm and said isolating means being adapted to operatively engage said end portion of said valve member disposed in said inlet chamber to move said valve member to said second position, thereby to close the communication between the said inlet chamber and said passage and to simultaneously open the communication between said passage and said exhaust chamber.